(12) United States Patent
Wang et al.

(10) Patent No.: US 11,504,672 B2
(45) Date of Patent: Nov. 22, 2022

(54) ROOM-TEMPERATURE SELECTIVE SWELLING METHOD OF PORE-FORMING USED FOR PREPARING SEPARATION MEMBRANES

(71) Applicant: NANJING TECH UNIVERSITY, Jiangsu (CN)

(72) Inventors: Yong Wang, Jiangsu (CN); Yanjie Wang, Jiangsu (CN); Jiemei Zhou, Jiangsu (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 0 days.

(21) Appl. No.: 17/596,985

(22) PCT Filed: Jun. 19, 2020

(86) PCT No.: PCT/CN2020/097143
§ 371 (c)(1),
(2) Date: Dec. 22, 2021

(87) PCT Pub. No.: WO2021/139094
PCT Pub. Date: Jul. 15, 2021

(65) Prior Publication Data
US 2022/0203305 A1 Jun. 30, 2022

(30) Foreign Application Priority Data
Jan. 6, 2020 (CN) .......................... 202010011009.8

(51) Int. Cl.
*B01D 67/00* (2006.01)
*B01D 71/80* (2006.01)

(52) U.S. Cl.
CPC .......... *B01D 67/003* (2013.01); *B01D 71/80* (2013.01); *B01D 2323/16* (2013.01)

(58) Field of Classification Search
CPC . B01D 2323/16; B01D 67/0088; B01D 71/68
See application file for complete search history.

(56) References Cited

U.S. PATENT DOCUMENTS

| 5,007,944 A | 4/1991 | Pinnau et al. |
| 8,829,062 B1 | 9/2014 | Minko et al. |
| 2021/0039052 A1* | 2/2021 | Dong .................. B01D 53/226 |

FOREIGN PATENT DOCUMENTS

| CN | 101011645 A | 8/2007 |
| CN | 101177493 A | 5/2008 |
| CN | 101704957 A | 5/2010 |
| CN | 103464015 B | 12/2015 |
| CN | 111167316 A | 5/2020 |

OTHER PUBLICATIONS

Wang et al. "Nanoporous polysulfones with in situ PEGylated surfaces by a simple swelling strategy using paired solvents". Chem. Commun. 2017, 53, 9105 (Year: 2017).*
Yang et al. "Efficient Synthesis of Poly(methacrylic acid)-block-Poly(styrene-alt-N-phenylmaleimide) Diblock Copolymer Lamellae Using RAFT Dispersion Polymerization" Macromolecules, 2013, 46, 8545-8556. (Year: 2013).*
International Search Report and Written Opinion, International Patent Application No. PCT/CN2020/097143, dated Oct. 12, 2020, with English translation of Search Report (10 pages).
Notice of Allowance, Chinese Patent Application No. 202010011009.8, dated Dec. 3, 2020, with English translation (2 pages).
Office Action, Chinese Patent Application No. 202010011009.8, dated Nov. 4, 2020, with English translation (7 pages).

* cited by examiner

*Primary Examiner* — Ryan B Huang
(74) *Attorney, Agent, or Firm* — Hamre, Schumann, Mueller & Larson, P.C.

(57) ABSTRACT

The present invention provides a room-temperature selective swelling method of pore-forming used for preparing separation membranes, comprising: treating a dense membrane of an amphiphilic block copolymer by a composite swelling agent at 15-30° C. for 1 min-24 h, removing the residual solvent, then leaving the membrane at room temperature to dry, so as to obtain an amphiphilic block copolymer separation membrane with a bi-continuous porous structure, wherein the composite swelling agent is composed of 60-96% of a first swelling agent and 4-40% of a second swelling agent, the first swelling agent is an alcohol solvent, the second swelling agent is selected from any one or a mixture of two or more of toluene, styrene, tetrahydrofuran, 1,4-dioxane and so on. In the method of the invention, selective swelling can be achieved at room temperature, abating the energy consumption in membrane-forming process. The method has universality and can be widely used in the pore-forming process of various amphiphilic block copolymers. The swelling level and morphology can be controlled by adjusting the composition of the solvent in the swelling agent and the second swelling agent content in the swelling agent.

15 Claims, 5 Drawing Sheets ate of the block copolymer on the microscopic scale under certain conditions, that is, microphase separation. The dispersed phases formed by microphase separation generally ranges from ~5-50 nm, so in the event of transforming the dispersed phases into voids in a certain way, we can obtain a mesoporous structure with a pore diameter of ~5-50 nm. This feature endows block copolymers with wide application to water treatment, especially to the technical field of ultrafiltration membranes used to separate macromolecular proteins and nanoparticles.

ROOM-TEMPERATURE SELECTIVE SWELLING METHOD OF PORE-FORMING USED FOR PREPARING SEPARATION MEMBRANES

TECHNICAL FIELD

The invention pertains to the technical field of porous materials and separation membranes, in particular relates to a method of pore-forming by room-temperature selective swelling, which is used for preparing separation membranes.

BACKGROUND ART

Block copolymers are a special class of polymers formed by connecting two or more thermodynamically-incompatible homopolymer chains by means of covalent bonds. Due to the thermodynamic incompatibility between each chain of the block copolymer, phase separation will happen to the block copolymer on the microscopic scale under certain conditions, that is, microphase separation. The dispersed phases formed by microphase separation generally ranges from ~5-50 nm, so in the event of transforming the dispersed phases into voids in a certain way, we can obtain a mesoporous structure with a pore diameter of ~5-50 nm. This feature endows block copolymers with wide application to water treatment, especially to the technical field of ultrafiltration membranes used to separate macromolecular proteins and nanoparticles.

In order to apply the microphase-separated block copolymer to the technical field of membrane separation, the first problem to be solved is pore formation, that is, how to transform the microdomains of dispersed phases into voids to form continuous mass transfer channels. The traditional method is to chemically etch and remove the unstable dispersed phases to form voids, leaving the continuous phases as a separation matrix. However, this method requires strict pore-forming conditions and is effectively applied only for specific block copolymers, which greatly limits the practicability of this method. In recent years, selective swelling acting as a pore-forming method requiring relatively mild conditions and no chemical reaction has aroused attention in block copolymer membrane production. However, swelling usually occurs in a relatively high temperature (50° C.-80° C.) environment, consuming a lot of energy, which results in hazards to environment and safety caused by heating a solvent, and is not conducive to the swelling pore-forming of a temperature-sensitive block copolymer. Therefore, it is urgent to develop a room-temperature selective swelling method of pore-forming, so as to promote the realization of the large-scale application in preparing separation membranes by selectively swelling block copolymers.

SUMMARY OF THE INVENTION

For the current problem that selective swelling requires high temperature and accordingly energy consumption is high, the invention provides a fast pore-forming method by room-temperature selective swelling, using a mixed solvent as a swelling agent.

The technical scheme of the present invention is as follows:

A room-temperature selective swelling method of pore-forming used for preparing separation membranes, comprising:

treating a dense membrane of an amphiphilic block copolymer by a composite swelling agent at 15-30° C. for 1 min-24 h, removing the residual solvent, then leaving the membrane at room temperature to dry, so as to obtain an amphiphilic block copolymer separation membrane with a bi-continuous porous structure, wherein, the composite swelling agent is composed of 60-96% of a first swelling agent and 4-40% of a second swelling agent by a volume fraction, the first swelling agent is an alcohol solvent, the second swelling agent is selected from any one or a mixture of two or more of toluene, o-xylene, styrene, dichloromethane, 1,2-dichloroethane, 1,1,2-trichloroethane, tetrahydrofuran or 1,4-dioxane.

In a preferred scheme of the present invention, the second swelling agent is selected from any one or a mixture of two or more of toluene, styrene, dichloromethane, tetrahydrofuran or 1,4-dioxane; preferably 1,4-dioxane.

In a preferred scheme of the present invention, the treating temperature is 20° C.

In a preferred scheme of the present invention, the treating time is 5-30 min or 4 h-8 h.

In the scheme of the invention, we can treat a dense membrane with a composite swelling agent in various prior ways, either by immersing the dense membrane in the composite swelling agent, or by coating the composite swelling agent onto the surface of the dense membrane.

In a preferred embodiment of the invention, the treating using the composite swelling agent is immersing the dense membrane in the composite swelling agent, and in the composite swelling agent, the second swelling agent is 12%-24% by a volume fraction, preferably 12-16%, most preferably 12%.

In a more preferred embodiment of the invention, the composite swelling agent is composed of ethanol and 1,4-dioxane, wherein the volume fraction of 1,4-dioxane is 12%, the treating temperature is 20° C., and the treating time is 8 h.

In other more preferred embodiment of the invention, the composite swelling agent is composed of ethanol and 1,4-dioxane, wherein the volume fraction of 1,4-dioxane is 16%, the treating temperature is 20° C., and the treating time is 4 h.

In another more preferred embodiment of the invention, the composite swelling agent is composed of ethanol and toluene, wherein the volume fraction of toluene is 12%, the treating temperature is 20° C., and the treating time is 4 h.

In another scheme of the invention, the treating using the composite swelling agent treatment is coating the composite swelling agent onto the surface of the dense membrane, and in the composite swelling agent, the second swelling agent is 16%-40% by a volume fraction, preferably 20-40%.

In a more preferred embodiment of the invention, the composite swelling agent is composed of ethanol and dichloromethane, wherein the volume fraction of dichloromethane is 16%, the treating temperature is 20° C., and the treating time is 5 min.

In another more preferred embodiment of the invention, the composite swelling agent is composed of ethanol and tetrahydrofuran, wherein the volume fraction of tetrahydrofuran is 40%, the treating temperature is 20° C., and the treating time is 5-10 min.

In the scheme of the invention, the amphiphilic block copolymer can be various amphiphilic block copolymers that can undergo microphase separation, and the dispersed phases in the amphiphilic block copolymer can form pores by means of selective swelling. Preferred, the amphiphilic block copolymer is composed of a Block A and a Block B (A-B), wherein the Block A is selected from any one of polystyrene (PS) and polysulfone (PSF), the Block B is selected from any one of poly(2-vinylpyridine) (P2VP), polyethylene oxide (PEO), polyethylene glycol (PEG) and poly(N,N-dimethylaminoethyl methacrylate) (PDMAEMA), and the total molecular weight of the amphiphilic block copolymer is 50,000 to 100,000 Daltons. The Block A more preferably is polystyrene (PS). The Block B more preferably is poly(2-vinylpyridine) (P2VP), poly(N, N-dimethylaminoethyl methacrylate) (PDMAEMA) or polyethylene glycol (PEG).

In the further preferred scheme of the invention, the percentage of the Block B to the total volume of the amphiphilic block copolymer is 10-40%, In several preferred embodiments of the invention, the amphiphilic block copolymer and its molecular weight are $PS_{53}$-$P2VP_{21}$, $PS_{60}$-$PEO_{36}$, $PSF_{60}$-$PEG_{20}$ or $PS_{70.1}$-$PDMAEMA_{21.5}$, respectively, where, the unit is kilodalton.

In the scheme of the invention, the dense membrane of an amphiphilic block copolymer is made by the prior art that the amphiphilic block copolymer is dissolved into an organic solvent to prepare a membrane-forming solution then the membrane-forming solution is coated to form a membrane. Such a solution-coating method can be implemented very conveniently in a laboratory, and yet we can also prepare the membrane by adopting the treating method such as melting the block copolymer and then extruding it In one embodiment of the invention, the steps of preparation of the dense membrane are dissolving the amphiphilic block copolymer into an organic solvent to prepare a membrane-forming solution with a concentration of 0.5-10 wt %, and then coating the solution to obtain the dense membrane.

The concentration of the membrane-forming solution is preferably 2 wt %.

The organic solvent can be selected from chloroform, dichloromethane, tetrahydrofuran or N,N-dimethylformamide, preferably chloroform.

We can prepare a membrane by coating the membrane-forming solution in various ways in the art, for example, spin-coating the membrane-forming solution on a silicon wafer substrate by a routine amount and then drying it to form a membrane; or spin-coating the membrane-forming solution on a microporous substrate by a routine amount and then drying it to form a membrane; or drop-coating the membrane-forming solution on a silicon wafer substrate by a routine amount and then drying it to form a membrane; the most preferred way is spin-coating the membrane-forming solution to form a membrane.

In a preferred scheme of the invention, steps are described as follows:

(1) Preparing a Membrane-Forming Solution

An amphiphilic block copolymer is dissolved in chloroform to prepare a membrane-forming solution with a 1-2 wt % concentration, wherein, the amphiphilic block copolymer is composed of a Block A and a Block B (A-B), the Block A is selected from any one of polystyrene (PS) and polysulfone (PSF), the Block B is selected from any one of poly(2-vinylpyridine) (P2VP), polyethylene oxide (PEO), polyethylene glycol (PEG) and poly(N,N-dimethylaminoethyl methacrylate) (PDMAEMA), the percentage of the Block B to the total volume of the amphiphilic block copolymer is 10-40%, the total molecular weight of the amphiphilic block copolymer is 50,000 to 100,000 Daltons;

(2) Forming a Membrane

A certain amount of the membrane-forming solution obtained in step (1) are spin-coated or drop-coated on a silicon wafer substrate, which is next placed in a natural environment for 6 hours, so as to completely volatilize the solvent to obtain a dense membrane of an amphiphilic block copolymer;

(3) Pore-Forming Process of Room-Temperature Selective Swelling

The membrane of an amphiphilic block copolymer obtained in step (2) is soaked in a container containing a composite swelling agent at 20° C., wherein the composite swelling agent is composed of 84-88% of ethanol and 12-16% of 1,4-dioxane by a volume fraction. The membrane of an amphiphilic block copolymer is immersed in the composite swelling agent at 20° C. for 4-8 hours to complete pore-forming, then immediately taken out, and washed three times with alcohol reagents, and left at room temperature for drying, to obtain a bi-continuous porous structure membrane of an amphiphilic block copolymer.

In another preferred scheme of the invention, steps are described as follows:

(1) Preparing a Membrane-Forming Solution

An amphiphilic block copolymer is dissolved in chloroform to prepare a membrane-forming solution with a 1-2 wt % concentration, wherein, the amphiphilic block copolymer is composed of Block A and Block B (A-B), the Block A is selected from any one of polystyrene (PS) and polysulfone (PSF), the Block B is selected from any one of poly(2-vinylpyridine) (P2VP), polyethylene oxide (PEO), polyethylene glycol (PEG) and poly(N,N-dimethylaminoethyl methacrylate) (PDMAEMA), the percentage of the Block B to the total volume of the amphiphilic block copolymer is 10-40%, the total molecular weight of the amphiphilic block copolymer is 50,000 to 100,000 Daltons;

(2) Forming a Membrane

A certain amount of the membrane-forming solution obtained in step (1) are spin-coated or drop-coated on a silicon wafer substrate, which is next placed in a natural environment for 6 hours, so as to completely volatilize the solvent to obtain a dense membrane of an amphiphilic block copolymer;

(3) Selective Swelling Pore-Forming at Room Temperature

A composite swelling agent is coated onto the membrane of an amphiphilic block copolymer obtained in step (2), which is placed at 20° C. for 5-10 minutes, until the composite swelling agent is completely volatilized and becomes dry, wherein, the composite swelling agent is composed of 60-84% of ethanol and 16-40% of dichloromethane or tetrahydrofuran by a volume fraction.

The invention has beneficial technical effects as follows:

(1) In the present invention, only by adding a small amount of organic reagents to alcohol solvents, we can greatly decrease the temperature required for the selective swelling pore-forming of the block copolymer, significantly shorten the selective swelling time, abate the energy consumption during selective swelling, and improve membrane-forming efficiency.

In the prior art, the pore-forming of the block copolymer by selective swelling usually occurs in a relatively high temperature (50° C.-80° C.) environment, consuming a lot of energy, which results in higher costs in industrial production and hazards to environment and safety caused by heating a solvent, and furthermore, is not conducive to the selective swelling pore-forming of a temperature-sensitive block copolymer. The inventor has discovered through researches that the pore-forming of the block copolymer by selective swelling can be effectively realized at room-temperature by adding a specific organic agent (that is, the second swelling agent of the invention) to alcohols. In addition, based on a large number of experiments, the inventor found that many swelling reagents that can be used for high-temperature selective swelling pore-forming in the prior art cannot all be used to be mixed with alcohol reagents to achieve selective swelling at room temperature in the invention. Although we generally believe that adjusting and extending the swelling time will improve the selective swelling effect, experiments have proved that some reagents that can be used for high-temperature selective swelling (such as chloroform, cyclohexane, N,N-dimethylformamide, etc.), even if we prolonged the swelling time at room temperature, they would effectively function difficultly (as shown in FIG. 1).

In addition, the inventor has also discovered that the swelling effect can be significantly improved by increasing the concentration of the second swelling agent, that is, shortening the swelling time and raising the swelling degree. Compared with the swelling at higher temperature described in the prior art, swelling at room temperature means that no heating is required so that the swelling manner is no longer limited to immersing a membrane in excess (a dozen milliliters or more) swelling agents. We can coat a very small amount (tens of microliters) of high-concentration swelling agents on the surface of the membranes, and place them at room temperature to wait for them to naturally evaporate and become dry, so as to achieve selective swelling pore-forming. In addition, the amount of the used swelling agents is small, and the swelling agent is very volatile, so the entire swelling treat only lasts for a few minutes.

(2) The selective swelling method at room temperature of the invention has universality for the selective swelling of general block copolymers, that is, can be widely used in the pore-forming process of various block copolymers.

(3) The method of the invention is simple, and can achieve precise control to the degree of pore-opening by changing the reagent type, reagent concentration and swelling time in the swelling agent.

The inventor has discovered through experiments that when using the same membrane material system for swelling pore-forming, we can obtain polymer membranes with different degrees of pore-opening due to different solvent types, solvent concentrations and swelling times Taking the polymer membrane of the PS-P2VP system as an example, as shown in FIG. 2, if the membrane is treated by the composite swelling agent with a 12% concentration of 1,4-dioxane for 1 hour at 20° C., the membrane changes little in thickness, and has a lower degree of pore-opening. After treating for 8 hours, the membrane will increase in thickness, and if the membrane is treated by the composite swelling agent with a 16% concentration of 1,4-dioxane for 4 hours, the membrane will further increase in thickness. When selecting tetrahydrofuran and ethanol as swelling agents, we can also obtain a higher swelling degree by swelling at 20° C. for 4 hours. Therefore, we can select an appropriate solvent type, solvent concentration and swelling time based on the implementation conditions and the target degree of pore-opening in actual production according to the method of the invention.

DETAILED DESCRIPTIONS OF THE PREFERRED EMBODIMENTS

The invention will be further explained below in combination with the examples. The following examples are only used for describing the invention, rather than limiting the implementation scope of the invention.

EXAMPLE 1

We add 0.02 g of $PS_{53}$-$P2VP_{21}$ block copolymers to 2 g of chloroform solutions and fully stir the solution to dissolve it, then filter the prepared polymer solution with a 200 μm pore-size filter to remove large particles of impurities; take 100 μL of the above solution, then spin-coat it on the silicon wafer substrate at 2000 rpm for 30 seconds, which is next placed at room temperature to naturally become dry for 6 hours, so as to completely volatilize the solvent to obtain a dense membrane of the block copolymer; immerse the membrane in a mixed solution containing ethanol and 1,4-dioxane, in which the volume fraction of 1,4-dioxane is 12%, after soaking the membrane at 20° C. for 1 hour, take it out and leave it at room temperature for drying.

Figure 1:
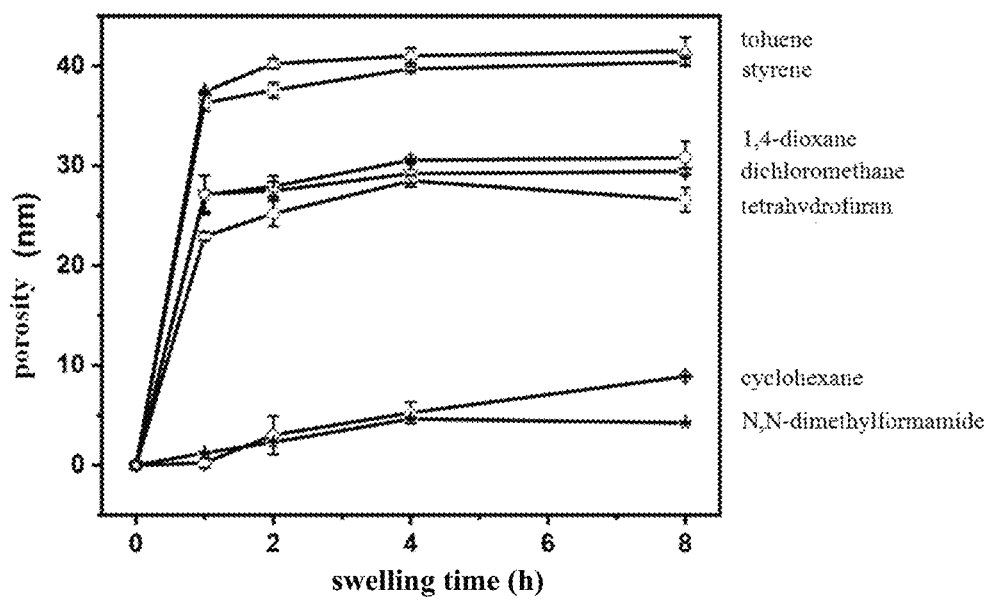
FIG. 1 is a graph showing the variation of the porosity of the PS-P2VP system in different swelling agent systems following the swelling time in the case of the second swelling agent with a 12% concentration.
Figure 2:
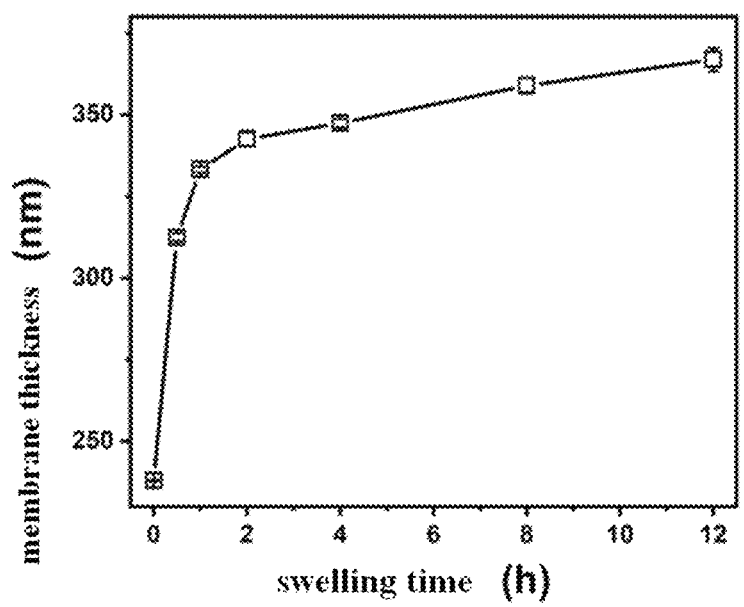
FIG. 2 is a graph showing the variation of the membrane thickness of the PS-P2VP system in 1,4-dioxane/ethanol system following the swelling time in the case of the 12% concentration.
Figure 3:
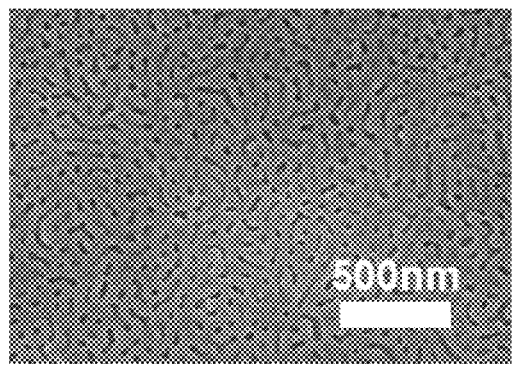
FIG. 3 is a SEM image of the porous structure of the block copolymer obtained in Example 1.

FIG. 3 is a SEM image of the porous structure of the block copolymer obtained in this example. It can be seen from the figure that if we treat the membrane by the composite swelling agent with a 12% concentration of 1,4-dioxane for 1 hour at 20° C., the membrane surface presents bi-continuous morphology to the lower extent with a relatively high degree of pore-opening for the membrane, showing that adding the neutral reagent of the dispersed phase and continuous phase of a block copolymer to alcohol reagents can achieve selective swelling pore-forming.

In addition, after measuring the thickness of the polymer membrane with increase from 238 nm to 333 nm in this example after swelling, the porosity of the membrane prepared under this conditions works out at 28%.

EXAMPLE 2

We add 0.02 g of $PS_{53}$-$P2VP_{21}$ block copolymers to 2 g of chloroform solutions and fully stir the solution to dissolve it, then filter the prepared polymer solution with a 200 μm pore-size filter to remove large particles of impurities; take 100 μL of the above solution, then spin-coat it on the silicon wafer substrate at 2000 rpm for 30 seconds, which is next placed at room temperature to naturally become dry for 6 hours, so as to completely volatilize the solvent to obtain a dense membrane of the block copolymer; immerse the membrane in a mixed solution containing ethanol and 1,4-dioxane, in which the volume fraction of 1,4-dioxane is 12%, after soaking the membrane at 20° C. for 8 hour, take it out and leave it at room temperature for drying.

Figure 4:
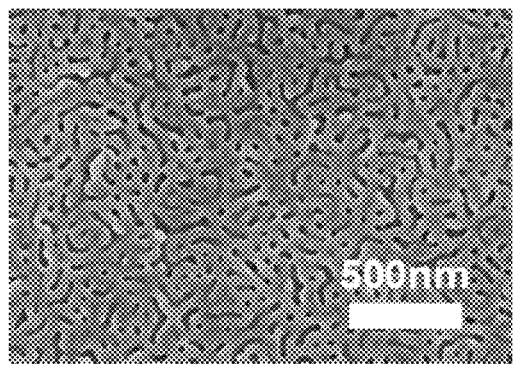
FIG. 4 is a SEM image of the porous structure of the block copolymer obtained in Example 2.

FIG. 4 is a SEM image of the porous stmcture of the block copolymer obtained in this example. It can be seen from the figure that if we treat the membrane by the composite swelling agent with a 12% concentration of 1,4-dioxane for 8 hours at 20° C., the membrane surface presents bi-continuous morphology to the high extent with a relatively high degree of pore-opening for the membrane, showing that the swelling degree can be improved by extending the swelling time.

In addition, after measuring the thickness of the polymer membrane with increase from 238 nm to 358 nm in this example after swelling, the porosity of the membrane prepared under this conditions works out at 34%.

EXAMPLE 3

We add 0.02 g of $PS_{53}$-$P2VP_{21}$ block copolymers to 2 g of chloroform solutions and fully stir the solution to dissolve it, then filter the prepared polymer solution with a 200 μm pore-size filter to remove large particles of impurities; take 100 μL of the above solution, then spin-coat it on the silicon wafer substrate at 2000 rpm for 30 seconds, which is next placed at room temperature to naturally become dry for 6 hours, so as to completely volatilize the solvent to obtain a dense membrane of the block copolymer; immerse the membrane in a mixed solution containing ethanol and 1,4-dioxane, in which the volume fraction of 1,4-dioxane is 16%, after soaking the membrane at 20° C. for 4 hour, take it out and leave it at room temperature for drying.

Figure 5:
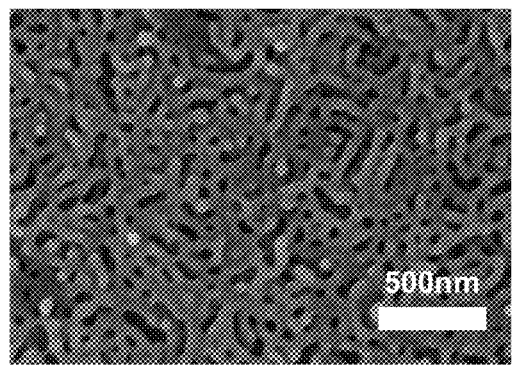
FIG. 5 is a SEM image of the porous structure of the block copolymer obtained in Example 3.

FIG. 5 is a SEM image of the porous stmcture of the block copolymer obtained in this example. It can be seen from the figure that if we treat the membrane by the composite swelling agent with a 16% concentration of 1,4-dioxane for 4 hours at 20° C., the membrane surface presents bi-continuous morphology to the high extent with a relatively high degree of pore-opening for the membrane, showing that the swelling can be accelerated by increasing the concentration of 1,4-dioxane in the solvent with an improvement of the swelling degree.

In addition, after measuring the thickness of the polymer membrane with increase from 245 nm to 406*nm* in this example after swelling, the porosity of the membrane prepared under this conditions works out at 40%.

EXAMPLE 4

We add 0.02 g of $PS_{60}$-$PEO_{36}$ block copolymers to 2 g of chloroform solutions and fully stir the solution to dissolve it, then filter the prepared polymer solution with a 200 μm pore-size filter to remove large particles of impurities; take 100 μL of the above solution, then spin-coat it on the silicon wafer substrate at 2000 rpm for 30 seconds, which is next placed at room temperature to naturally become dry for 6 hours, so as to completely volatilize the solvent to obtain a dense membrane of the block copolymer; immerse the membrane in a mixed solution containing ethanol and dichloromethane, in which the volume fraction of dichloromethane is 16%, after soaking the membrane at 20° C. for 4 hour, take it out and leave it at room temperature for drying.

Figure 6:
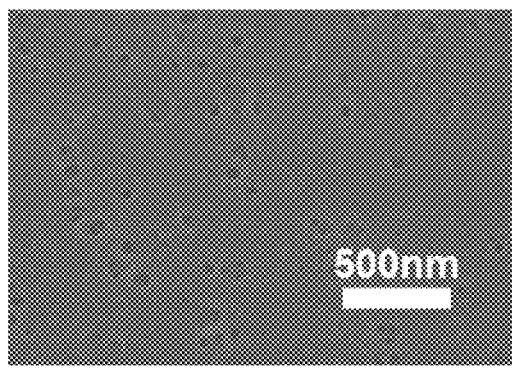
FIG. 6 is a SEM image of the porous structure of the block copolymer obtained in Example 4.
Figure 7:
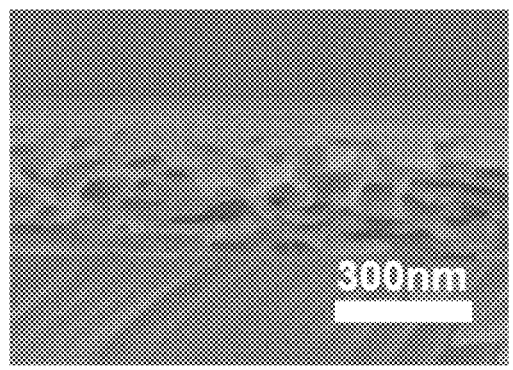
FIG. 7 is a SEM image of the porous structure of the block copolymer obtained in Example 4.

FIG. 6 and FIG. 7 are a SEM image of the porous structure of the block copolymer obtained in this example, respectively. It can be seen from the figure that if we treat the membrane by the composite swelling agent with a 16% concentration of dichloromethane for 4 hours at 20° C., the membrane surface presents bi-continuous morphology to the lower extent with a relatively lower degree of pore-opening for the membrane surface, but a relatively high degree of pore-opening for the membrane cross section, showing that the mixed solvent of dichloromethane and ethanol acting as a swelling agent for selective swelling pore-forming at room temperature is effective to the block copolymer system.

In addition, after measuring the thickness of the polymer membrane with increase from 270 nm to 325 nm in this example after swelling, the porosity of the membrane prepared under this conditions works out at 17%.

EXAMPLE 5

We add 0.02 g of $PSF_{60}$-$PEG_{20}$ block copolymers to 2 g of chloroform solutions and fully stir the solution to dissolve it, then filter the prepared polymer solution with a 200 μm pore-size filter to remove large particles of impurities; take 100 μL of the above solution, then spin-coat it on the silicon wafer substrate at 2000 rpm for 30 seconds, which is next placed at room temperature to naturally become dry for 6 hours, so as to completely volatilize the solvent to obtain a dense membrane of the block copolymer; immerse the membrane in a mixed solution containing ethanol and toluene, in which the volume fraction of toluene is 24%, after soaking the membrane at 20° C. for 4 hour, take it out and leave it at room temperature for drying.

Figure 8:
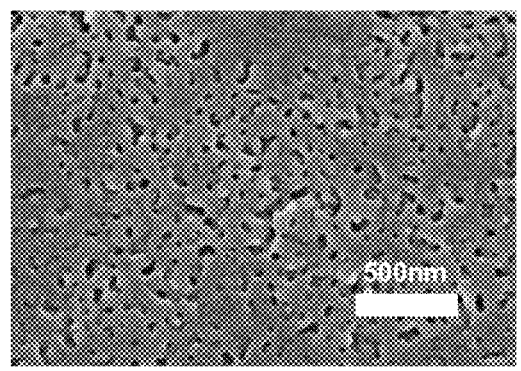
FIG. 8 is a SEM image of the porous structure of the block copolymer obtained in Example 5.

FIG. 8 is a SEM image of the porous structure of the block copolymer obtained in this example. It can be seen from the figure that if we treat the membrane by the composite swelling agent with a 24% concentration of toluene for 4 hours at 20° C., the membrane surface presents bi-continuous morphology to the high extent, showing that the mixed solvent of toluene and ethanol acting as a swelling agent for selective swelling pore-forming at room temperature is effective to the block copolymer system.

In addition, after measuring the thickness of the polymer membrane with increase from 229 nm to 305 nm in this example after swelling, the porosity of the membrane prepared under this conditions works out at 25%.

EXAMPLE 6

We add 0.02 g of $PS_{70.1}$-$PDMAEMA_{21.5}$ block copolymers to 2 g of chloroform solutions and fully stir the solution to dissolve it, then filter the prepared polymer solution with a 200 μm pore-size filter to remove large particles of impurities; take 100 μL of the above solution, then spin-coat it on the silicon wafer substrate at 2000 rpm for 30 seconds, which is next placed at room temperature to naturally become dry for 6 hours, so as to completely volatilize the solvent to obtain a dense membrane of the block copolymer; immerse the membrane in a mixed solution containing ethanol and 1,4-dioxane, in which the volume fraction of 1,4-dioxane is 16%, after soaking the membrane at 20° C. for 4 hour, take it out and leave it at room temperature for drying.

Figure 9:
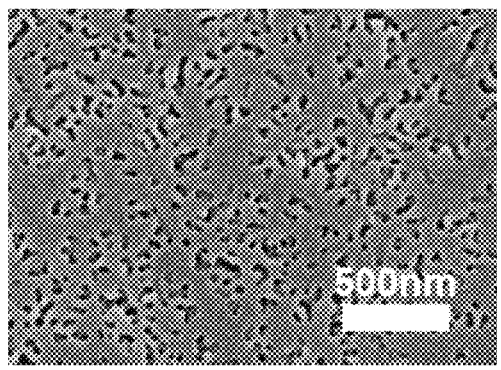
FIG. 9 is a SEM image of the porous structure of the block copolymer obtained in Example 6.

FIG. 9 is a SEM image of the porous structure of the block copolymer obtained in this example. It can be seen from the figure that if we treat the membrane by the composite swelling agent with a 16% concentration of 1,4-dioxane for 4 hours at 20° C., the membrane surface presents bi-continuous morphology, showing that the mixed solvent of 1,4-dioxane and ethanol acting as a swelling agent for selective swelling pore-forming at room temperature is effective to the block copolymer system.

In addition, after measuring the thickness of the polymer membrane with increase from 218 nm to 281 nm in this example after swelling, the porosity of the membrane prepared under this conditions works out at 22%.

EXAMPLE 7

We add 0.02 g of PS53-$P2VP_{21}$ block copolymers to 2 g of chloroform solutions and fully stir the solution to dissolve it, then filter the prepared polymer solution with a 200 μm pore-size filter to remove large particles of impurities; take 100 μL of the above solution, then spin-coat it on the silicon wafer substrate at 2000 rpm for 30 seconds, which is next placed at room temperature to naturally become dry for 6 hours, so as to completely volatilize the solvent to obtain a dense membrane of the block copolymer; immerse the membrane in a mixed solution containing ethanol and tetrahydrofuran, in which the volume fraction of tetrahydrofuran is 12%, after soaking the membrane at 20° C. for 4 hour, take it out and leave it at room temperature for drying.

Figure 10:
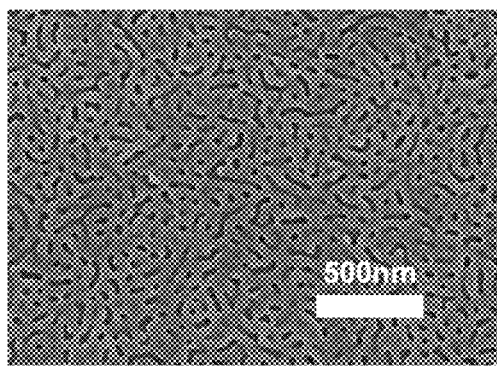
FIG. 10 is a SEM image of the porous structure of the block copolymer obtained in Example 7.

FIG. 10 is a SEM image of the porous structure of the block copolymer obtained in this example. It can be seen from the figure that if we treat the membrane by the composite swelling agent with a 12% concentration of tetrahydrofuran for 4 hours at 20° C., the membrane surface presents bi-continuous morphology to the high extent with a relatively high degree of pore-opening for the membrane, showing that the ethanol/tetrahydrofuran system can be suitable to selective swelling pore-forming at room temperature.

EXAMPLE 8

We add 0.02 g of $PS_{53}$-$P2VP_{21}$ block copolymers to 2 g of chloroform solutions and fully stir the solution to dissolve it, then filter the prepared polymer solution with a 200 μm pore-size filter to remove large particles of impurities; take 100 μL of the above solution, then spin-coat it on the silicon wafer substrate at 2000 rpm for 30 seconds, which is next placed at room temperature to naturally become dry for 6 hours, so as to completely volatilize the solvent to obtain a dense membrane of the block copolymer; immerse the membrane in a mixed solution containing ethanol and styrene, in which the volume fraction of styrene is 12%, after soaking the membrane at 20° C. for 4 hour, take it out and leave it at room temperature for drying.

Figure 11:
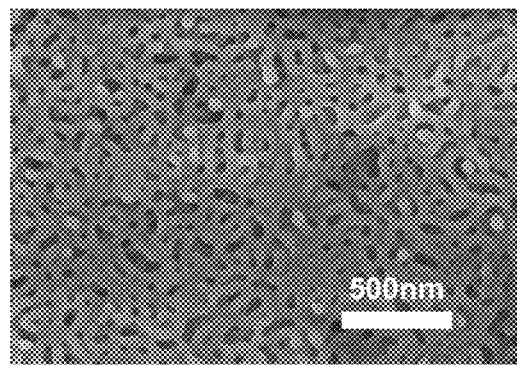
FIG. 11 is a SEM image of the porous structure of the block copolymer obtained in Example 8.

FIG. 11 is a SEM image of the porous structure of the block copolymer obtained in this example. It can be seen from the figure that if we treat the membrane by the composite swelling agent with a 12% concentration of styrene for 4 hours at 20° C., the membrane surface presents bi-continuous morphology to the high extent with a relatively high degree of pore-opening for the membrane, showing that the ethanol/styrene system can be suitable to selective swelling pore-forming at room temperature.

EXAMPLE 9

We add 0.02 g of $PS_{53}$-$P2VP_{21}$ block copolymers to 2 g of chloroform solutions and fully stir the solution to dissolve it, then filter the prepared polymer solution with a 200 μm pore-size filter to remove large particles of impurities; take 100 μL of the above solution, then spin-coat it on the macroporous polyvinylidene fluoride substrate at 2000 rpm for 30 seconds, which is next placed at room temperature to naturally become dry for 6 hours, so as to completely volatilize the solvent to obtain a dense membrane of the block copolymer; immerse the membrane in a mixed solution containing ethanol and 1,4-dioxane, in which the volume fraction of 1,4-dioxane is 12%, after soaking the membrane at 20° C. for 4 hours, take it out and leave it at room temperature for drying.

The composite membrane of the porous block copolymer obtained in this example can be used to separate the macromolecules in water system. The composite membrane has a pure water permeance of ~530 $L/(m^2 \cdot h \cdot bar)$, and a rejection to bovine serum protein of 68%.

Comparison 1

We add 0.02 g of $PS_{53}$-P2VP21 block copolymers to 2 g of chloroform solutions and fully stir the solution to dissolve it, then filter the prepared polymer solution with a 200 μm pore-size filter to remove large particles of impurities; take 100 μL of the above solution, then spin-coat it on the silicon wafer substrate at 2000 rpm for 30 seconds, which is next placed at room temperature to naturally become dry for 6 hours, so as to completely volatilize the solvent to obtain a dense membrane of the block copolymer; immerse the membrane in pure ethanol reagent, after soaking the membrane at 20° C. for 4 hour, take it out and leave it at room temperature for drying.

Figure 12:
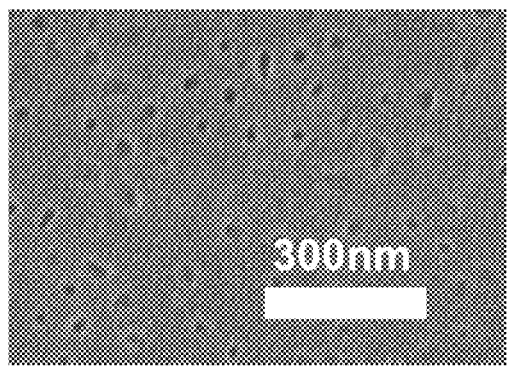
FIG. 12 is a SEM image of the porous structure of the block copolymer obtained in Comparison 1.
Figure 13:
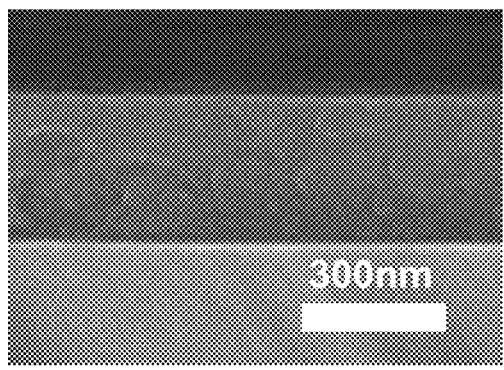
FIG. 13 is a SEM image of the porous structure of the block copolymer obtained in Comparison 1.

FIG. 12 and FIG. 13 are a SEM image of the porous structure of the block copolymer obtained in this comparison, respectively. It can be seen from the figure that a pure ethanol solvent cannot achieve pore-forming throughout the entire polymer membrane at 20° C., only leaving some shallow pores caused by segregation on the surface, and no pores are formed in the cross section, showing that reagents only selective to the dispersed phases of a block copolymer cannot achieve selective swelling pore-forming.

Comparison 2

We add 0.02 g of $PS_{53}$-$P2VP_{21}$ block copolymers to 2 g of chloroform solutions and fully stir the solution to dissolve it, then filter the prepared polymer solution with a 200 μm pore-size filter to remove large particles of impurities; take 100 μL of the above solution, then spin-coat it on the silicon wafer substrate at 2000 rpm for 30 seconds, which is next placed at room temperature to naturally become dry for 6 hours, so as to completely volatilize the solvent to obtain a dense membrane of the block copolymer; immerse the membrane in a mixed solution containing ethanol and N,N-dimethylformamide, in which the volume fraction of N,N-dimethylformamide is 12%, after soaking the membrane at 20° C. for 4 hour, take it out and leave it at room temperature for drying.

Figure 14:
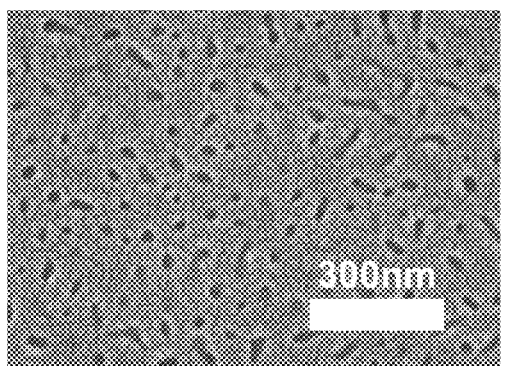
FIG. 14 is a SEM image of the porous structure of the block copolymer obtained in Comparison 2.
Figure 15:
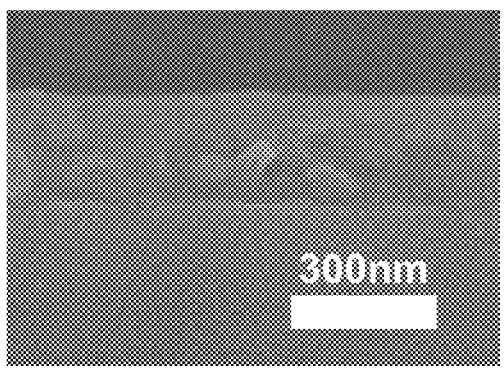
FIG. 15 is a SEM image of the porous structure of the block copolymer obtained in Comparison 2.

FIG. 14 and FIG. 15 are a SEM image of the porous structure of the block copolymer obtained in this comparison, respectively. It can be seen from the figure that if we treat the membrane by the composite swelling agent with a 12% concentration of N,N-dimethylformamide for 4 hours at 20° C., only leaving some shallow pores caused by segregation on the surface, and no pores are formed in the cross section, showing that adding reagents only selective to the dispersed phases of a block copolymer to alcohol reagents at room temperature cannot achieve selective swelling pore-forming.

In addition, after measuring the thickness of the polymer membrane with increase from 237 nm to 247 nm in this example after swelling, the porosity of the membrane prepared under this conditions works out at 5%.

Comparison 3

We add 0.02 g of $PS_{53}$-$P2VP_{21}$ block copolymers to 2 g of chloroform solutions and fully stir the solution to dissolve it, then filter the prepared polymer solution with a 200 μm pore-size filter to remove large particles of impurities; take 100 μL of the above solution, then spin-coat it on the silicon wafer substrate at 2000 rpm for 30 seconds, which is next placed at room temperature to naturally become dry for 6 hours, so as to completely volatilize the solvent to obtain a dense membrane of the block copolymer; immerse the membrane in a mixed solution containing ethanol and cyclohexane, in which the volume fraction of cyclohexane is 12%, after soaking the membrane at 20° C. for 4 hour, take it out and leave it at room temperature for drying.

Figure 16:
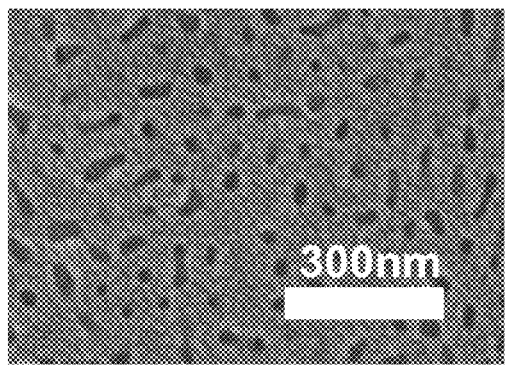
FIG. 16 is a SEM image of the porous structure of the block copolymer obtained in Comparison 3.
Figure 17:
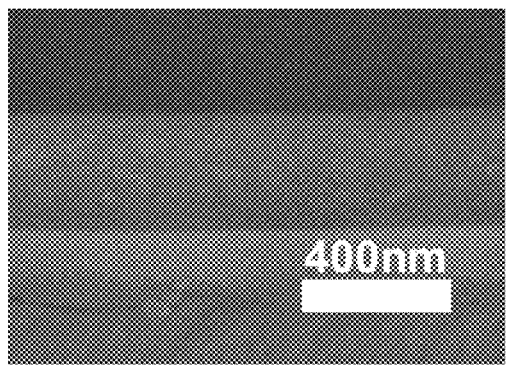
FIG. 17 is a SEM image of the porous structure of the block copolymer obtained in Comparison 3.

FIG. 16 and FIG. 17 are a SEM image of the porous structure of the block copolymer obtained in this comparison, respectively. It can be seen from the figure that if we treat the membrane by the composite swelling agent with a 12% concentration of cyclohexane for 4 hours at 20° C., only leaving some shallow pores caused by segregation on the surface, and no pores are formed in the cross section, showing that adding reagents strong selective to the continuous phases of a block copolymer to alcohol reagents at room temperature also cannot achieve selective swelling pore-forming.

EXAMPLE 10

We add 0.02 g of $PS_{53}$-$P2VP_{21}$ block copolymers to 2 g of chloroform solutions and fully stir the solution to dissolve it, then filter the prepared polymer solution with a 200 μm pore-size filter to remove large particles of impurities; take 200 μL of the above solution, then spin-coat it on the 1.5 cm×1.5 cm silicon wafer substrate, which is next placed at room temperature to naturally become dry for 12 hours, so as to completely volatilize the solvent to obtain a dense membrane of the block copolymer. We use a mixed solution of dichloromethane with a volume fraction of 16% and ethanol with a volume fraction of 84% as a swelling agent, and evenly apply 50 μl of the agent on the membrane surface, then treat it at 20° C. until it naturally evaporates and becomes dry. As ethanol and dichloromethane are highly volatile, and the swelling agent is completely volatilized in only 5 minutes.

Figure 18:
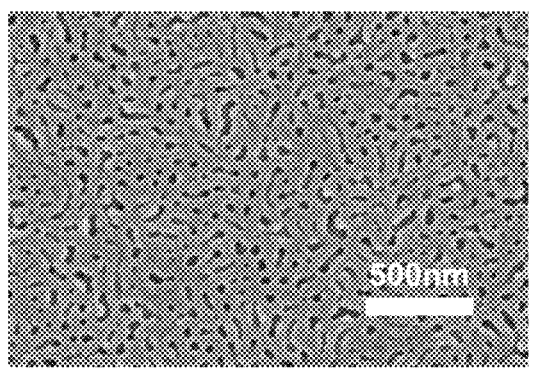
FIG. 18 is a SEM image of the porous structure of the block copolymer obtained in Example 10.
Figure 19:
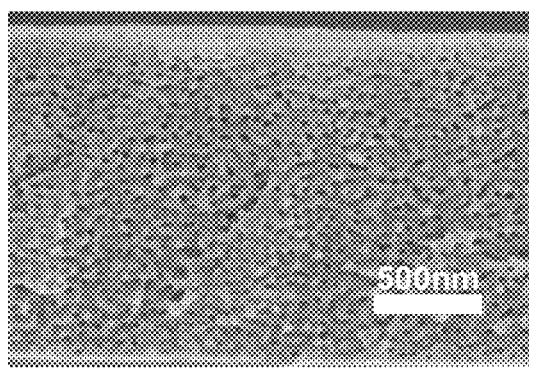
FIG. 19 is a SEM image of the porous structure of the block copolymer obtained in Example 10.

FIG. 18 and FIG. 19 are a SEM image of the porous structure of the block copolymer obtained in this example, respectively. It can be seen from the figure that when the dichloromethane content is high, only using a small amount of swelling agents can achieve selective swelling pore-forming in a short time, presenting a bi-continuous structure on both the surface and the cross section, showing that the swelling time can be significantly decreased by increasing the second agent content in the swelling agent, while the swelling is undergoing at room temperature without heating, which make it feasible to apply only a small amount of swelling agents on the membrane surface for selective swelling.

EXAMPLE 11

We add 0.02 g of $PS_{60}$-$P2VP_{20}$ block copolymers to 2 g of chloroform solutions and fully stir the solution to dissolve it, then filter the prepared polymer solution with a 200 μm pore-size filter to remove large particles of impurities; take 100 μL of the above solution, then spin-coat it on the silicon wafer substrate at 2000 rpm for 30 seconds, which is next placed at room temperature to naturally become dry for 6 hours, so as to completely volatilize the solvent to obtain a dense membrane of the block copolymer. We use a mixed solution of tetrahydrofuran with a volume fraction of 40% and ethanol with a volume fraction of 60% as a swelling agent, and evenly apply 50 ul of the agent on the membrane surface, then treat it at 20° C. until it naturally evaporates and becomes dry.

Figure 20:
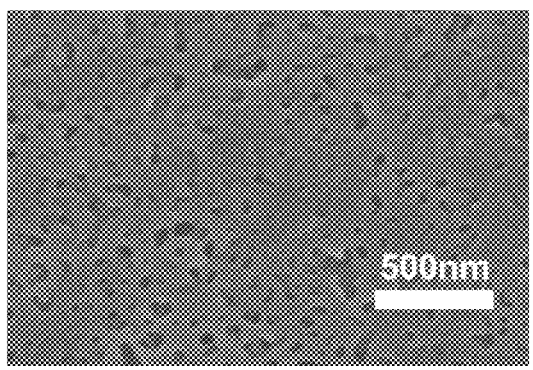
FIG. 20 is a SEM image of the porous structure of the block copolymer obtained in Example 11.
Figure 21:
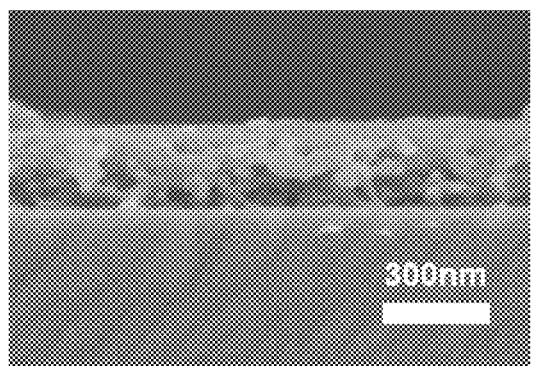
FIG. 21 is a SEM image of the porous structure of the block copolymer obtained in Example 11.

FIG. 20 and FIG. 21 are a SEM image of the porous structure of the block copolymer obtained in this example, respectively. It can be seen from the figure that when the tetrahydrofuran content is high, only using a small amount of swelling agents can achieve selective swelling pore-forming of the block copolymer, presenting a bi-continuous structure on both the surface and the cross section.

In addition, after measuring the thickness of the polymer membrane obtain in this example after swelling, the thickness increases from 230 nm to 331 mn, and the porosity of the membrane prepared under this conditions works out at 31%.

The invention claimed is:
1. A room-temperature selective swelling method of pore-forming used for preparing separation membranes, comprising:
    treating a dense membrane of an amphiphilic block copolymer by a composite swelling agent at 15-30° C. for 1 min-24 h, removing the residual solvent, then leaving the membrane at room temperature to dry, so as to obtain an amphiphilic block copolymer separation membrane with a bi-continuous porous structure,
    wherein, the composite swelling agent is composed of 60-96% of a first swelling agent and 4-40% of a second swelling agent by a volume fraction, the first swelling agent is an alcohol solvent, the second swelling agent is selected from any one or a mixture of two or more of toluene, o-xylene, styrene, dichloromethane, 1,2-dichloroethane, 1,1,2-trichloroethane, tetrahydrofuran or 1,4-dioxane.

2. The method according to claim 1, wherein the second swelling agent is selected from any one or a mixture of two or more of toluene, styrene, dichloromethane, tetrahydrofuran or 1,4-dioxane.

3. The method according to claim 1, wherein the second swelling agent is 1,4-dioxane.

4. The method according to claim 1, wherein the alcohol solvent is selected from methanol, ethanol, butanol, isopropanol, ethylene glycol or glycerol.

5. The method according to claim 1, wherein the alcohol solvent is ethanol.

6. The method according to claim 1, wherein treating a dense membrane of an amphiphilic block copolymer by a composite swelling agent at 20° C.

7. The method according to claim 1, wherein the step of treating a dense membrane of an amphiphilic block copolymer by a composite swelling agent is performed for 5-10 min or 4 h-8 h.

8. The method according to claim 1, wherein the step of treating a dense membrane of an amphiphilic block copolymer by the composite swelling agent comprises immersing the dense membrane in the composite swelling agent, and the composite swelling agent comprises 12%-24% by a volume fraction of the second swelling agent.

9. The method according to claim 8, wherein the composite swelling agent comprises 12-16% volume fraction of the second swelling agent.

10. The method according to claim 8, wherein the composite swelling agent comprises 12% volume fraction of the second swelling agent.

11. The method according to claim 1, wherein the step of treating a dense membrane of an amphiphilic block copolymer by the composite swelling agent comprises coating the composite swelling agent onto the dense membrane, and the composite swelling agent comprises 16%-40% by a volume fraction of the second swelling agent.

12. The method according to claim 11, wherein the composite swelling agent comprises 20%-40% volume fraction of the second swelling agent.

13. The method according to claim 1, wherein the amphiphilic block copolymer is composed of a Block A and a Block B (A-B), the Block A is selected from any one of polystyrene (PS) or polysulfone (PSF), the Block B is selected from any one of poly(2-vinylpyridine) (P2VP), polyethylene oxide (PEO), polyethylene glycol (PEG) or poly(N,N-dimethylaminoethyl methacrylate) (PDMAEMA), and the total molecular weight of the amphiphilic block copolymer is 50,000 to 100,000 Daltons.

14. A room-temperature selective swelling method of pore-forming used for preparing separation membranes, comprising:
preparing a membrane-forming solution with a 1-2% wt concentration by dissolving an amphiphilic block copolymer in a solvent including chloroform, the amphiphilic block copolymer being composed of a Block A and a Block B (A-B), the Block A being selected from any one of polystyrene (PS) and polysulfone (PSF), the Block B being selected from any one of poly(2-vinylpyridine) (P2VP), polyethylene oxide (PEO), polyethylene glycol (PEG) and poly(N,N-dimethylaminoethyl methacrylate) (PDMAEMA), the percentage of the Block B to the total volume of the amphiphilic block copolymer being 10-40%, and the total molecular weight of the amphiphilic block copolymer being 50,000 to 100,000 Daltons;
forming a dense membrane of the amphiphilic block copolymer, comprising:
spin-coating or drop-coating a certain amount of the membrane-forming solution obtained on a silicon wafer substrate, and next placing the silicon wafer substrate in a natural environment for 6 hours, so as to completely volatilize the solvent to obtain the dense membrane of the amphiphilic block copolymer; and
selective swelling pore-forming at room-temperature, comprising:
soaking the dense membrane of the amphiphilic block copolymer in a container containing a composite swelling agent at 20° C., the composite swelling agent being composed of 84-88% of ethanol and 12-16% of 1,4-dioxane by a volume fraction, immersing the dense membrane of the amphiphilic block copolymer in the composite swelling agent at 20° C. for 4-8 hours to complete pore-forming, then taking out the dense membrane, washing the dense membrane three times with alcohol reagents, and leaving the dense membrane at room temperature for drying, to obtain a bi-continuous porous structure membrane of the amphiphilic block copolymer.

15. A room-temperature selective swelling method of pore-forming used for preparing separation membranes, comprising:
preparing a membrane-forming solution with a 1-2 wt % concentration by dissolving an amphiphilic block copolymer in a solvent including chloroform, the amphiphilic block copolymer being composed of Block A and Block B (A-B), the Block A being selected from any one of polystyrene (PS) and polysulfone (PSF), the Block B being selected from any one of poly(2-vinylpyridine) (P2VP), polyethylene oxide (PEO), polyethylene glycol (PEG) and poly(N,N-dimethylaminoethyl methacrylate) (PDMAEMA), the percentage of the Block B to the total volume of the amphiphilic block copolymer being 10-40%, the total molecular weight of the amphiphilic block copolymer being 50,000 to 100,000 Daltons;
forming a dense membrane of the amphiphilic block copolymer, comprising:
spin-coating or drop-coating a certain amount of the membrane-forming solution obtained on a silicon wafer substrate, and next placing the silicon wafer substrate in a natural environment for 6 hours, so as to completely volatilize the solvent to obtain the dense membrane of the amphiphilic block copolymer; and
selective swelling pore-forming at room-temperature comprising:
coating a composite swelling agent onto the membrane of the amphiphilic block copolymer then placing the dense membrane at 20° C. for 5-10 minutes, until the composite swelling agent is completely volatilized and becomes dry, the composite swelling agent being composed of 60-84% of ethanol and 16-40% of dichloromethane or tetrahydrofuran by a volume fraction.

* * * * *